J. BRIGGS.
Lacing-Hook.

No. 222,449.  Patented Dec. 9, 1879.

Witnesses
A. J. Oettinger
Wm. W. Sdwyer.

Inventor
Josiah Briggs
by his atty
C. C. Raymond

UNITED STATES PATENT OFFICE.

JOSIAH BRIGGS, OF NEWARK, NEW JERSEY, ASSIGNOR TO EDWARD MAYNZ, OF BOSTON, MASSACHUSETTS.

IMPROVEMENT IN LACING-HOOKS.

Specification forming part of Letters Patent No. 222,449, dated December 9, 1879; application filed July 12, 1879.

*To all whom it may concern:*

Be it known that I, JOSIAH BRIGGS, of Newark, in the county of Essex, in the State of New Jersey, have invented an Improvement in Lacing-Hooks, of which the following is a specification.

This invention has for its object the following-described improvement in lacing-hooks.

Reference is had to the accompanying drawings, forming a part of this specification, in explaining the nature of the same, in which—

Figure 1:
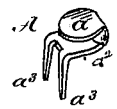
Figure 2:
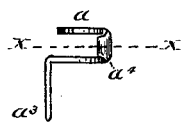
Figure 3:
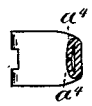
Figure 4:
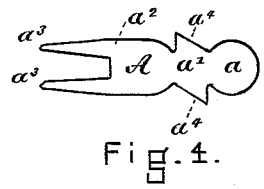

Figure 1 is a perspective of the complete hook. Fig. 2 is a cross-section thereof. Fig. 3 is a transverse section through the shank. Fig. 4 is a plan of the sheet-metal blank from which the hook is formed.

The lacing-hook is formed from a blank, A, stamped from thin sheet metal sufficiently ductile, and it is provided with the enlarged head-forming portion, $a$, the connecting portion or shank $a'$, the seat $a^2$, and the prongs $a^3$.

The shank may be provided with the wing extensions $a^4$ or not, as desired. The blank thus shaped is represented in Fig. 4. It is then formed to the shape represented in Fig. 1, the head $a$ being substantially parallel with the seat $a^2$. The prongs $a^3$ project at right angle from the seat. When the wings or extensions $a^4$ are used, they are bent inwardly toward each other, so as to be inclosed between the head and seat of the hook, and to form a rounded surface upon the inner side of the shank. This construction not only strengthens the shank, but relieves the edges from a sharpness which they might otherwise possess.

I do not confine myself to the use of two prongs, but may use one, if desired. The fastening-prongs must be sufficiently long to penetrate well into or through the material to which the hook is to be fastened and clinch therein.

The hook is adapted, more especially, for use on shoes as a stud or projection in and around which the shoe-string is passed in lacing the shoe.

The object of this invention is to provide a cheap, efficient, and strong fastening for wearing-apparel and other purposes; and I have ascertained that this can best be attained by employing a sheet-metal blank, such as above set forth, in which the neck connecting the head of the hook with the seat shall be short, and shall connect that edge of the head and that edge of the seat which are on a line, and shall not extend from one edge of the head-forming portion across the same to the seat, as shown in the shoe-fastening described in the patent granted to William H. Shurtleff, June 5, 1856, No. 55,431. I have also found it necessary, for the objects named, to form the prongs as extensions from the seat and upon the same line with each other and with the seat, neck, and head of the hook for two reasons: first, to effect an economy in stock; and, second, to so place the prongs that the prongs in the completed hook may be upon a line with each other at the end of the seat with their broad surfaces exposed at right angles to the line of strain.

I am aware that the said Shurtleff patent describes a hook provided with three fastening-prongs, one extending from the extreme end and one from each of the two sides. This construction employs more stock than is employed by me, and in the complete hook two of the prongs are so arranged that their wide surfaces instead of being at right angles to the line of strain are parallel therewith, a construction which I particularly desire to prevent, and in which I have succeeded. I therefore do not claim any portion of the Shurtleff invention.

Having thus fully described my invention, I claim and desire to secure by Letters Patent of the United States—

1. A lacing-hook having the head $a$, the neck $a'$, arranged to connect the outer edge of the head with the outer edge of the seat $a^2$, as shown, the said seat $a^2$ and the prongs $a^3$ arranged to project at right angles from the end of the seat on the same line, as represented, and struck up from the sheet-metal blank A.

2. A sheet-metal blank for forming lacing-hooks for wearing-apparel and other purposes, adapted to be struck into shape consisting of a head-forming portion, $a$, the short connecting portion or neck $a'$, the seat $a^2$, the two prongs, $a^3$, in line with the seat, neck, and head, substantially as and for the purposes described.

JOSIAH BRIGGS.

Witnesses:
PHILIP ELSWORTH,
CHAS. E. LATHROP.